United States Patent
Aziz

(10) Patent No.: US 9,215,414 B2
(45) Date of Patent: Dec. 15, 2015

(54) SELECTION OF A MULTIPOINT CONTROL UNIT (MCU) FOR A VIDEO MEETING ON A NETWORK

(71) Applicant: Cisco Technology, Inc., San Jose, CA (US)

(72) Inventor: Zaheer Aziz, Murphy, TX (US)

(73) Assignee: Cisco Technology, Inc., San Jose, CA (US)

( * ) Notice: Subject to any disclaimer, the term of this patent is extended or adjusted under 35 U.S.C. 154(b) by 357 days.

(21) Appl. No.: 13/832,815

(22) Filed: Mar. 15, 2013

(65) Prior Publication Data

US 2014/0267573 A1   Sep. 18, 2014

(51) Int. Cl.
*H04N 7/14* (2006.01)
*H04N 7/15* (2006.01)
*H04L 12/18* (2006.01)

(52) U.S. Cl.
CPC ............ *H04N 7/152* (2013.01); *H04L 12/1818* (2013.01); *H04N 7/147* (2013.01)

(58) Field of Classification Search
CPC .............................. H04M 3/56–3/569; H04M 2203/10–2203/1008; H04M 2203/2011; H04M 2203/2072; H04M 2203/2088; H04M 2203/2094; H04L 12/16; H04L 12/18–12/1895
USPC ................... 348/14.01–14.16; 370/259–271, 370/351–357; 379/201.01, 202.01, 207.03, 379/220.01–221.14; 709/201–207, 709/217–248

See application file for complete search history.

(56) References Cited

U.S. PATENT DOCUMENTS

| | | | |
|---|---|---|---|
| 5,473,363 A * | 12/1995 | Ng et al. | 348/14.09 |
| 6,687,234 B1 * | 2/2004 | Shaffer et al. | 370/260 |
| 7,213,050 B1 * | 5/2007 | Shaffer et al. | 709/204 |
| 7,456,858 B2 * | 11/2008 | Schrader et al. | 348/14.09 |
| 7,747,688 B2 * | 6/2010 | Narayanaswami et al. | 709/204 |
| 7,916,855 B2 * | 3/2011 | Caballero-McCann et al. | 379/221.04 |
| 2008/0025316 A1 * | 1/2008 | Zampiello et al. | 370/395.3 |
| 2008/0266383 A1 * | 10/2008 | Shah et al. | 348/14.09 |
| 2009/0063856 A1 | 3/2009 | Dunn et al. | |
| 2010/0082557 A1 | 4/2010 | Gao et al. | |

* cited by examiner

*Primary Examiner* — Hemant Patel
(74) *Attorney, Agent, or Firm* — Edell, Shapiro & Finnan, LLC

(57) ABSTRACT

To select an appropriate multipoint control unit (MCU) for hosting an upcoming video meeting, video meeting data of previous meetings is stored, including time and location data associated with meetings conducted on a bridge ID and attended by participants located in different regions. The schedule time of an upcoming video meeting using the bridge ID is compared with the time data of previous video meetings on the bridge ID to identify related video meetings among the previous video meetings, the related video meetings being time correlated with the scheduled time of the upcoming video meeting. One of a number of MCUs in the network is selected to be a host MCU to host the upcoming video meeting based on the location data of the related video meetings, in which the host MCU is selected as a function of its proximity to locations of participants of the related video meetings.

24 Claims, 7 Drawing Sheets

CDR TABLE

| USER ID | USER PHONE NUMBER | BRIDGE ID | CALL TIME |
|---|---|---|---|
| USER 3 | 408-332-3321 | ID 1234 | 1/3/12, 8:15AM - 10:43AM |
| USER 33 | 703-231-3212 | ID 3213 | 1/4/12, 3:33PM - 3:50PM |
| USER 1 | 240-332-1311 | ID 1234 | 7/1/11, 7:01AM - 8:32AM |
| ... | ... | ... | ... |
| USER 17 | 414-332-3993 | ID 1236 | 3/8/10, 4:00PM - 4:46PM |

FIG.5

SELECTION OF A MULTIPOINT CONTROL UNIT (MCU) FOR A VIDEO MEETING ON A NETWORK

TECHNICAL FIELD

The present disclosure relates generally to minimizing bandwidth utilization within a network, such as a Wide Area Network (WAN), for accommodating a video meeting.

BACKGROUND

In video conferencing solutions, an individual can be assigned a personal static video bridge identification (ID) which can be used at any time to set up a "rendezvous," "ad hoc," or "static" video conference or "meeting." Such video meetings often involve participants at a number of separate locations such that video source streams must be routed between participant endpoints over a wide area network (WAN) connecting the sites of the participants. A Multipoint Control Unit (MCU) located at one of the sites provides a media server resource for facilitating the communication between the multiple endpoints at the various sites, thereby enabling group video conferencing and collaboration.

To set up a video meeting, an initiator can provide his/her personal static bridge ID to the invitees of the meeting, e.g., by sending an invitation that includes the personal static video bridge ID and the date and time of day of the meeting. Personal static bridge IDs are typically permanently mapped to one MCU resource in the network. Thus, all video meetings initiated by an individual with his/her personal static bridge ID will use the same MCU to host meetings regardless of the source location of video users invited to or participating in the meetings. With static (rendezvous or ad hoc) video meetings, the locations of the participant users are not known in advance, and the endpoints for the video source streams are established on the fly as participants join the meeting. Depending on the locations of the participants of a particular video meeting, the location of the MCU associated with the personal static bridge ID used for the video meeting may cause an unnecessarily high number of video source streams to be routed across the WAN, resulting in an inefficient use of network resources. This problem is exacerbated when numerous individuals are assigned their own personal static bridge IDs and video bridges are frequently deployed in multiple regions of the network, producing heavy traffic across one or more WANs that connect those regions to each other. With widespread video conferencing, this scenario may result in inefficient WAN usage caused by insufficient available bandwidth, increased video latency, packet loss, and jitter.

BRIEF DESCRIPTION OF THE DRAWINGS

FIG. 5 is a chart showing stored call detail records that may be used to select an appropriate MCU for a static video conference according to the techniques presented herein.

DESCRIPTION OF EXAMPLE EMBODIMENTS

Overview

Figure 1:
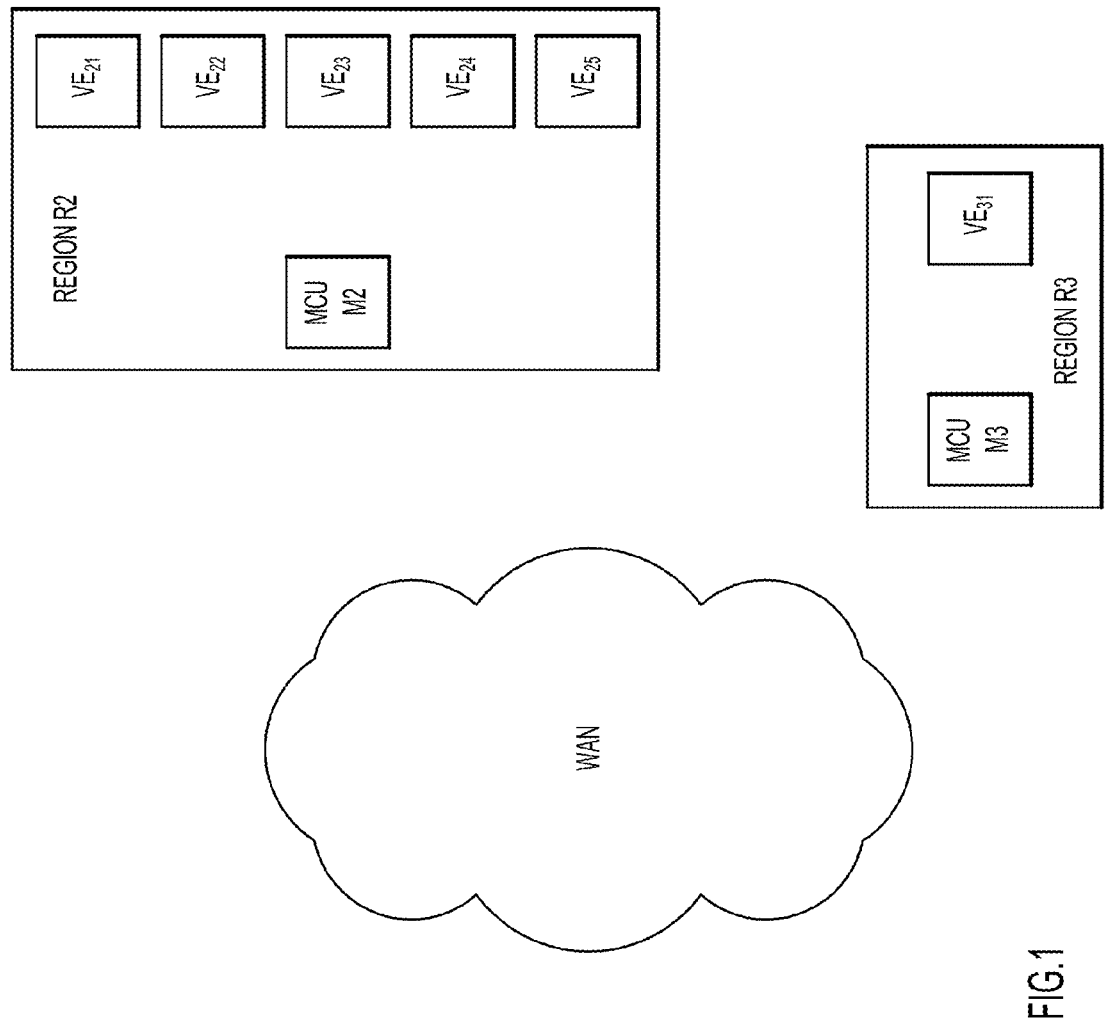
FIG. 1 is a diagram of a multi-region network environment in which a video teleconference meeting may be conducted according to the techniques presented herein.
Figure 1:
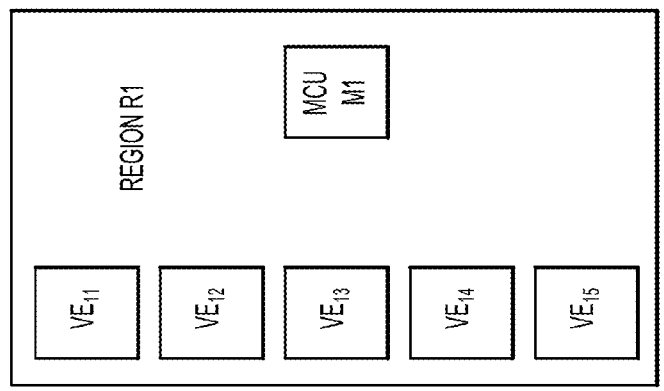

Presented herein are techniques to allocate an appropriate MCU to a static (e.g., rendezvous or ad hoc) video meeting.

According to one technique, historical video meeting data associated with video meetings conducted on a bridge ID is stored. In general, the video meetings are attended by participants located in a plurality of regions coupled via a wide area network, with multipoint control units (MCUs) capable of hosting video meetings being located in at least some of the regions. The video meeting data stored for each video meeting includes historical time data indicating a scheduled meeting time, including the time of day and date, of the video meeting and location data indicating locations of participants of the video meeting. Time data of an upcoming video meeting scheduled to occur on the bridge ID is compared with the time data of previous video meetings on the bridge ID to identify related video meetings among the previous video meetings, the related video meetings being time correlated with the upcoming video meeting (e.g., same time of day, same day of the week, and/or same date of the month). One of the multipoint control units (MCUs) is preselected to be the host MCU to host the upcoming video meeting based on the location data of the related video meetings, wherein the host MCU is selected as a function of its proximity to locations of participants of the related video meetings. In this manner, historical data of the locations of participants of previous video meetings that correlate with the timing of an upcoming video meeting (e.g., same time of day, same day of the week, same date of the month) can be used to preselect a host MCU for the upcoming video meeting. The technique does not require evaluation of the actual invitees to the upcoming video meeting.

Example Embodiments

Techniques described in detail below provide for the selection of an appropriate MCU to be used in conducting a static (rendezvous or ad hoc) video teleconference meeting initiated with a static bridge ID associated with an entity such as an individual. The goal of the MCU selection is to pick, for an upcoming video meeting, an MCU whose location is likely to result in minimal WAN traffic during the video meeting due to the MCU being located in the region or location having the highest number of meeting participants, thereby reducing the number of video source streams that need to traverse the WAN. The scheme described herein essentially makes an educated guess as to which region or location will have the greatest number of participants in an upcoming (future) video meeting on a specific static bridge ID by looking at past video meetings using that same static bridge ID that occurred at the same time of day, on the same day of the week, on the same day of the month, etc. The notion behind this approach is that a person using his/her static bridge ID to set up video meetings generally tends to schedule the same types of video meetings at regular times of the day, days of the week, or dates of the month, such that the geographical distribution of participants of future meetings is likely to be similar to the distribution patterns of participants of time-correlated past video meetings.

This analysis for selecting an MCU for an upcoming video meeting can be performed without any knowledge or consideration of the invitees or participants of the upcoming video meeting. Likewise, the identities of participants of previous video meetings are not of particular importance; rather, only the locations of participants of previous video meetings are necessary to understand their geographical distribution. By identifying past video meetings that were held at the same or similar time of day, the same day of the week, or the same date of the month as an upcoming video meeting, a more accurate prediction of the likely distribution of participants in an upcoming video meeting can be obtained, since it is often the case that people schedule certain types of video meetings at regular times (e.g., staff meetings at Monday, 9:00 a.m.; budget meetings on the third day of each month at 2:00 p.m.), and generally the same people attend the same types of meetings and tend to join the meetings from the same video endpoints over time. Since the MCU selection scheme essentially predicts a site or region where the greatest number of participants is likely to occur based on time-correlated past video meetings rather than on who is invited to the upcoming video meeting, the selected host MCU may reside in a region that does not correspond to a region where the greatest number of invitees to the video meeting are located. Further, in some instances it may turn out that, once a video meeting occurs, the preselected MCU is not actually in the correct region to minimize WAN usage for that particular meeting based on the geographic distribution of the actual participants. Nevertheless, in general, this approach to MCU selection results in superior performance and efficiency compared to implementations in which the static bridge ID is permanently associated a particular MCU.

In more detail, by utilizing information of past meetings initiated by a video meeting initiator (e.g., past meetings using the same static bridge ID as an upcoming meeting), an appropriate MCU from a plurality of candidate MCUs can be selected for an upcoming static meeting (also referred to as a rendezvous or ad hoc meeting) in which the video endpoints are not reserved in advance, based on traffic patterns discerned from those past meetings. The information of past meetings may correspond to call detail records (CDRs) that include a static bridge ID associated with the meeting call, information of the date/time of the meeting, and the locations of participants calling in to the meeting (e.g., the area code of the caller). Based on a correlation of CDRs associated with a particular static bridge ID with a date/time of an upcoming static meeting, such as a meeting to be held at Wednesday, Jan. 5, 2013 at 2:00 p.m., relevant CDRs that match with the date/time of the upcoming meeting are retrieved, and an appropriate MCU that is located in a region where the greater number of participants in past, time-correlated video meeting attendees is selected for that upcoming meeting. By way of an example, all CDRs associated with a particular static bridge ID that occurred on the fifth day of a month are retrieved to determine the appropriate MCU for the upcoming meeting; in another example, all CDRs associated with a particular static bridge ID that happened at 2:00 p.m. on any day of the month are retrieved to determine the appropriate MCU for the upcoming meeting to be conducted tomorrow at 2:00 p.m., in which other date/time correlations can be made while remaining within the spirit and scope of the techniques described herein.

To illustrate the concept, the MCU selection technique is described in greater detail in connection with FIGS. 1-7.

When an entity, such as a company employee, wants to set up a video meeting to take place sometime in the future, the video meeting creator (the "initiator") typically sends an "invitation" to a plurality of individuals, such as by email. The invitation may include a personal video bridge ID associated with the initiator, such as www.1234meeting.com, and the date and time when the meeting is to take place. When the time for the meeting arrives, each invited person can log onto the address associated with the personal video bridge ID provided to him/her in the email, and the video conference can then take place, using an MCU to control the processing of video to/from the individual video conference participants.

If the meeting is a non-reserved meeting, such as a static ad hoc or static rendezvous meeting, the video endpoints are not reserved in advance, and each participant has to find an available video endpoint at the appointed date and time in order to attend the meeting. The available video endpoint may be at a different location from what the same participant used to attend a previously scheduled meeting (e.g., a meeting conducted at the same day of week and time of day during the previous week). Some video conferences are set up on a scheduled basis, such as a technology share meeting that occurs every Monday between 8 a.m. and 9 a.m. Pacific Standard Time (PST), or a board meeting that occurs every other Wednesday between 1 p.m. and 3 p.m. PST.

FIG. 1 is a diagram of a multi-region network environment in which a video teleconference meeting can be held. In this example, three regions of a network (R1, R2, and R3) are interconnected by a wide area network (WAN), such as the Internet. Each of the regions contains a number of video endpoints (VEs) which can be any of a wide variety of end user devices capable of rendering streamed video images (e.g., a suitably equipped desktop computer or terminal, a laptop computer, a tablet computing device, or a mobile telephone). In this example, there are five video endpoints in region R1 ($VE_{11}$-$VE_{15}$), five video endpoints in region R2 ($VE_{21}$-$VE_{25}$), and one video endpoint in region R3 ($VE_{31}$). Each region in this example also includes an MCU (i.e., MCU M1 is located in region R1, MCU M2 is located in region R2, and MCU M3 is located in region R3). Each region may correspond to a particular room in the same building (e.g., region R1 corresponds to the first floor of a building, region R2 corresponds to the second floor of the building, and region R3 corresponds to the third floor of the build), a particular building amongst several buildings in a same building complex, a particular city in the same country (e.g., region R1 corresponds to New York, N.Y., region R2 corresponds to Chicago, Ill., and region R3 corresponds to San Jose, Calif.), or a particular country (e.g., region R1 corresponds to the U.S., region R2 corresponds to India, and region R3 corresponds to Japan), for example. A device within one region communicates with a device within another region via signals that pass through the WAN, whereas devices located in the same region can communicate with each other via a local MCU without generating traffic over the WAN residing between the regions. It will be appreciated that the example shown in FIG. 1 is a highly simplified network representation useful for purposes of illustration. The techniques described herein are nevertheless applicable to a wide variety of network topologies that involve any number and arrangement of regions, video endpoints, and network connection mechanisms. For simplicity, MCUs M1, M2, M3 can be of equal scale and capacity in this example; however, in general, the MCUs deployed throughout a network can vary in capability and capacity.

For a static rendezvous or static ad hoc video meeting in which video conference endpoints are not set up or reserved in advance of the video meeting, not much may be known about the video conference end points to be used by invitees who will join that rendezvous or ad hoc video meeting. Typically, when the first participant (who may be the video meeting initiator or an invitee) dials into the video meeting (e.g., by selecting the network address associated with the static video bridge ID provided to each participant), a controller within the network initiates an MCU associated with the static bridge ID in order to start the meeting. As previously described, conventionally this will be an MCU that is permanently associated with static bridge ID of the meeting initiator, which is typically located in initiator's home region.

Consider a conventional scenario in which an employee has received a static bridge ID "1234" from a network conference coordinator (e.g., a network device responsible for administering network teleconferencing). Bridge ID 1234 is statically mapped on MCU M1 located in region R1. Thus, all calls when dialed into the bridge using bridge ID 1234 will be hosted on MCU M1. Bridge ID 1234 is used by the employee for his regularly scheduled meetings, and generally, the same video dial-in users join the employee's scheduled meetings on a recurring basis. Such user attendance is typically seen in staff meeting and planning meetings, etc.

Table 1 below shows populated meeting pattern data for meetings that occur daily for bridge ID 1234. Table 1 data can readily be developed and obtained, for example, from the Call Detail Records (CDR) option from any of the call control devices in the network. An example of such call control device can be, by way of example, Cisco Unified Communication Manager (CUCM) or Video Communication Server (VCS).

Figure 3:
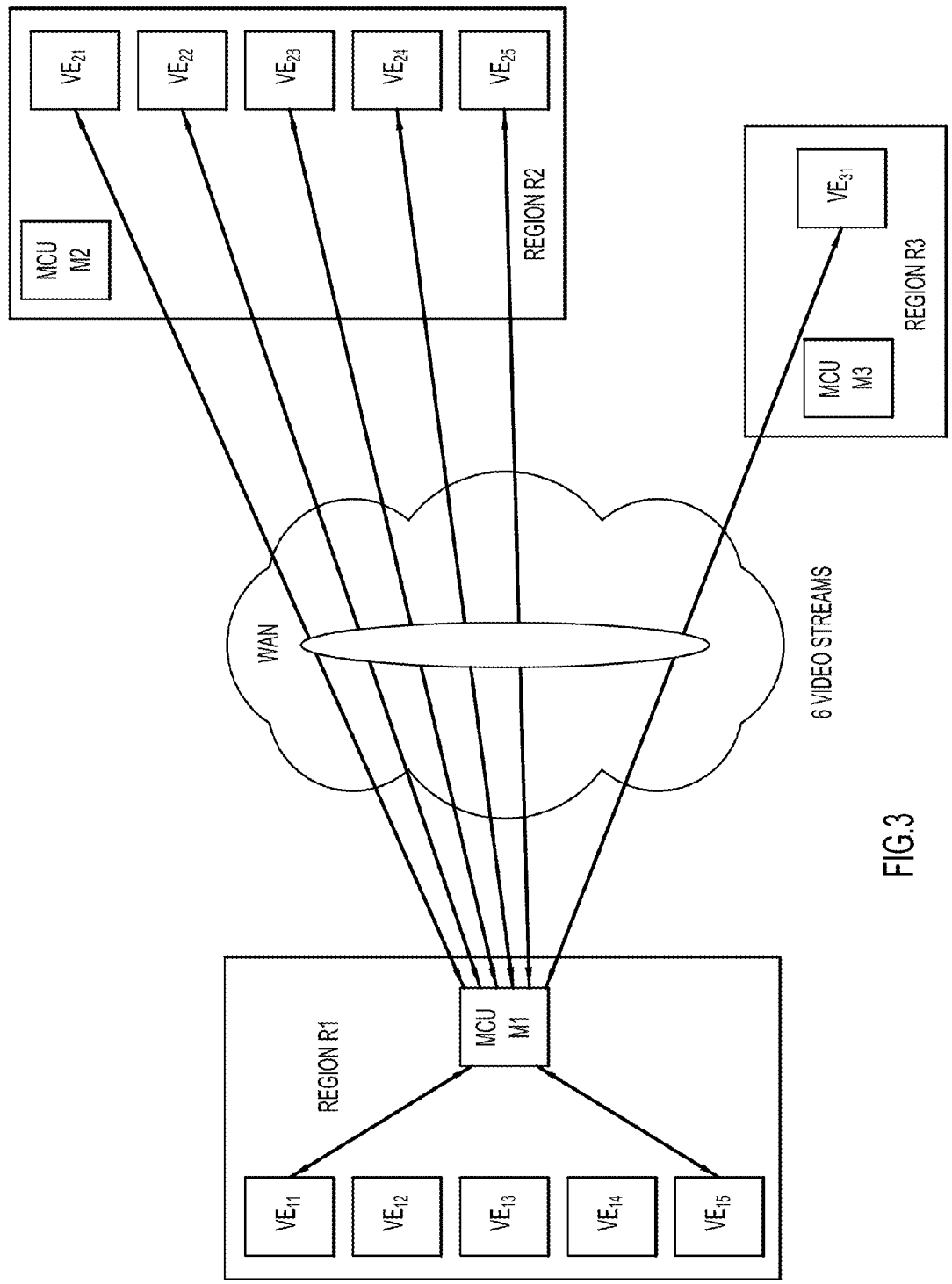
FIG. 3 is a diagram of the multi-region network showing the video stream WAN traffic resulting from hosting a video teleconference meeting among a second set of participants with the same MCU.

As shown in FIG. 3, for Meeting No. 2 at 3:00 p.m. PST, the greatest number of the video endpoint users and hence their source video streams are in region R2 (five in this example), with two source video streams coming from region R1 and one source video stream coming from region R3. Since Meeting ID 1234 is statically mapped to host on MCU M1 in region R1, six source video streams will cross the WAN to support video Meeting No. 2 (i.e., five source video streams traverse the WAN between regions R1 and R2 and one source video stream traverses the WAN between regions R1 and R3). This greater number of source video streams will cause higher WAN bandwidth usage and may add latency, loss, and jitter for some users in region R2 and region R3, which are undesirable for video conferencing. A better choice for the host MCU for Meeting No. 2 is MCU M2 in region 2, which would have resulted in only three source video streams (two between regions R1 and R2, and one between regions R2 and R3) traversing the WAN. Thus, the static assignment of static bridge ID 1234 to MCU M1 results in a sub-optimal use of network resources in the case of Meeting No. 2.

According to the techniques described herein, an individual's static bridge ID is not statically mapped to a particular MCU. Instead, the MCU expected to result in the minimum amount of video stream WAN traffic is selected from a set of available MCUs to host an upcoming or future meeting based on historical data of past video meetings that are related in some time sense to the upcoming meeting. Continuing with the simplified example shown in FIGS. 1-3, since Meeting No. 1 is held every day on static bridge ID 1234 at 8:00 a.m., the historical call records associated with past video meetings held at 8:00 a.m. are stored and, prior to an upcoming 8:00

TABLE 1

Daily Meeting Participant Patterns
Obtained for Bridge ID 1234 with Assigned MCU

| Meeting Number | Meeting Time (PST) for Bridge 1234 | Number of Participant in Region R1 | Number of Participant in Region R2 | Number of Participant in Region R3 | Assigned MCU for Bridge ID 1234 |
|---|---|---|---|---|---|
| 1 | 8:00 to 9:00 a.m. | 5 | 2 | 1 | M1 in Region R1 |
| 2 | 3:00 to 4:00 p.m. | 2 | 5 | 1 | M1 in Region R1 |

Table 1 includes data for two meetings. Meeting No. 1 occurred at 8 a.m. PST and included five video users (VE$_{11}$-VE$_{15}$) that dialed in from region R1, two video users (VE$_{21}$ and VE$_{25}$) that dialed in from region R2, and one video user (VE$_{31}$) that dialed in from region R3, respectively. Meeting No. 2 occurred at 3:00 p.m. PST and included two video users (VE$_{11}$ and VE$_{15}$) that dialed in from region R1, five video users (VE$_{21}$-VE$_{25}$) that dialed in from region R2, and one video user (VE$_{31}$) that dialed in from region R3, respectively. In both meetings, dialed using bridge ID 1234, MCU M1 is selected for conducting those meetings, because bridge ID 1234 is statically mapped to MCU M1 by the conference administrator.

Figure 2:
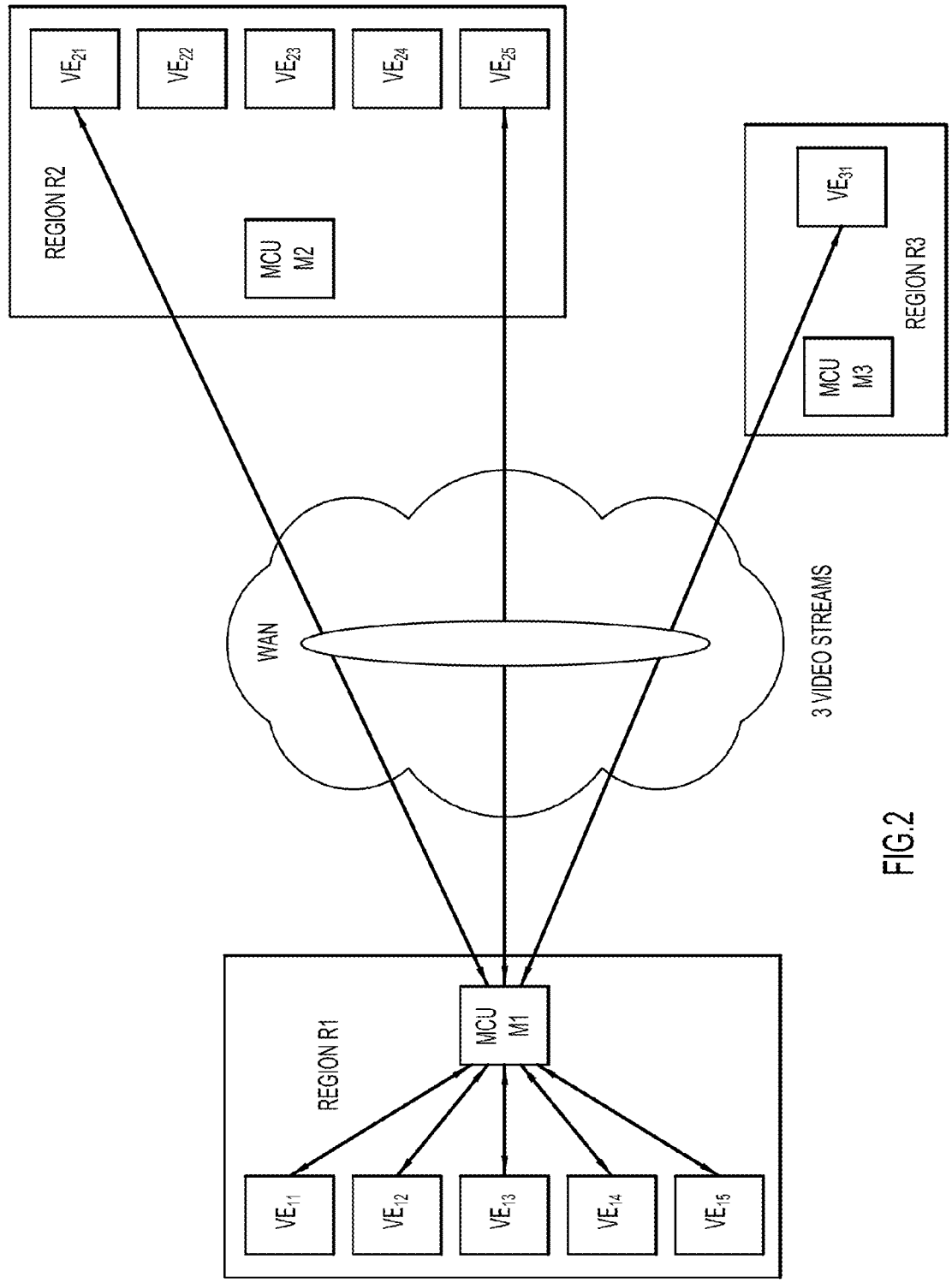
FIG. 2 is a diagram of the multi-region network showing the video stream WAN traffic resulting from hosting a video teleconference meeting among a first set of participants with a particular MCU.

As shown in FIG. 2, for Meeting No. 1 at 8 a.m., three video streams traverse the WAN (i.e., two from region R2 and one from region R3) to be received by MCU M1 in region R1. MCU M1 is the best MCU for Meeting No. 1, because the greatest number of video endpoint users happens to be in region R1 along with MCU M1. This arrangement results in minimal network traffic across the WAN relative to using one of the other MCUs for Meeting No. 1, since the five video streams between the video endpoint users of region R1 and MCU M1 do not traverse the WAN between the regions.

a.m. meeting, examined to determine from which region the greatest number of participants joined the 8:00 a.m. meetings. If analysis of previous 8:00 a.m. video meetings reveals that the greatest number of participants joined the 8:00 a.m. meetings from region R1, then the static bridge ID is "moved" to be hosted by MCU M1 prior to the beginning of the upcoming video meeting to be held at 8:00 a.m.

Likewise, since Meeting No. 2 is held every day on static bridge ID 1234 at 3:00 p.m., the historical call records associated with past video meetings held at 3:00 p.m. are stored and, prior to an upcoming 3:00 p.m. meeting, examined to determine from which region the greatest number of participants joined the 3:00 p.m. meetings. If analysis of previous 3:00 p.m. video meetings reveals that the greatest number of participants joined the 3:00 p.m. meetings from region R2, then the static bridge ID is "moved" to be hosted by MCU M2 prior to the beginning of the upcoming video meeting to be held at 3:00 p.m. In this example, where two meetings are held each day at the same two times using the same static bridge ID, these steps are repeated each day, in order to assign the appropriate MCU for these meetings.

Table 2 below shows the change of MCU selection of Meeting No. 2 to MCU M2 in region R2, which is based on historical data of past meetings that took place at the same time as Meeting No. 2 using the same bridge ID associated with Meeting No. 2.

TABLE 2

Daily Meeting Participants Patterns for Bridge ID 1234 with MCU selection

| Meeting Number | Time (PST) | Number of Participant in Region R1 | Number of Participant in Region R2 | Number of Participant in Region R3 | MCU Selection |
|---|---|---|---|---|---|
| 1 | 8:00 to 9:00 a.m. | 5 | 2 | 1 | M1 in Region R1 |
| 2 | 3:00 to 4:00 p.m. | 2 | 5 | 1 | M2 in Region R2 |

Figure 4:
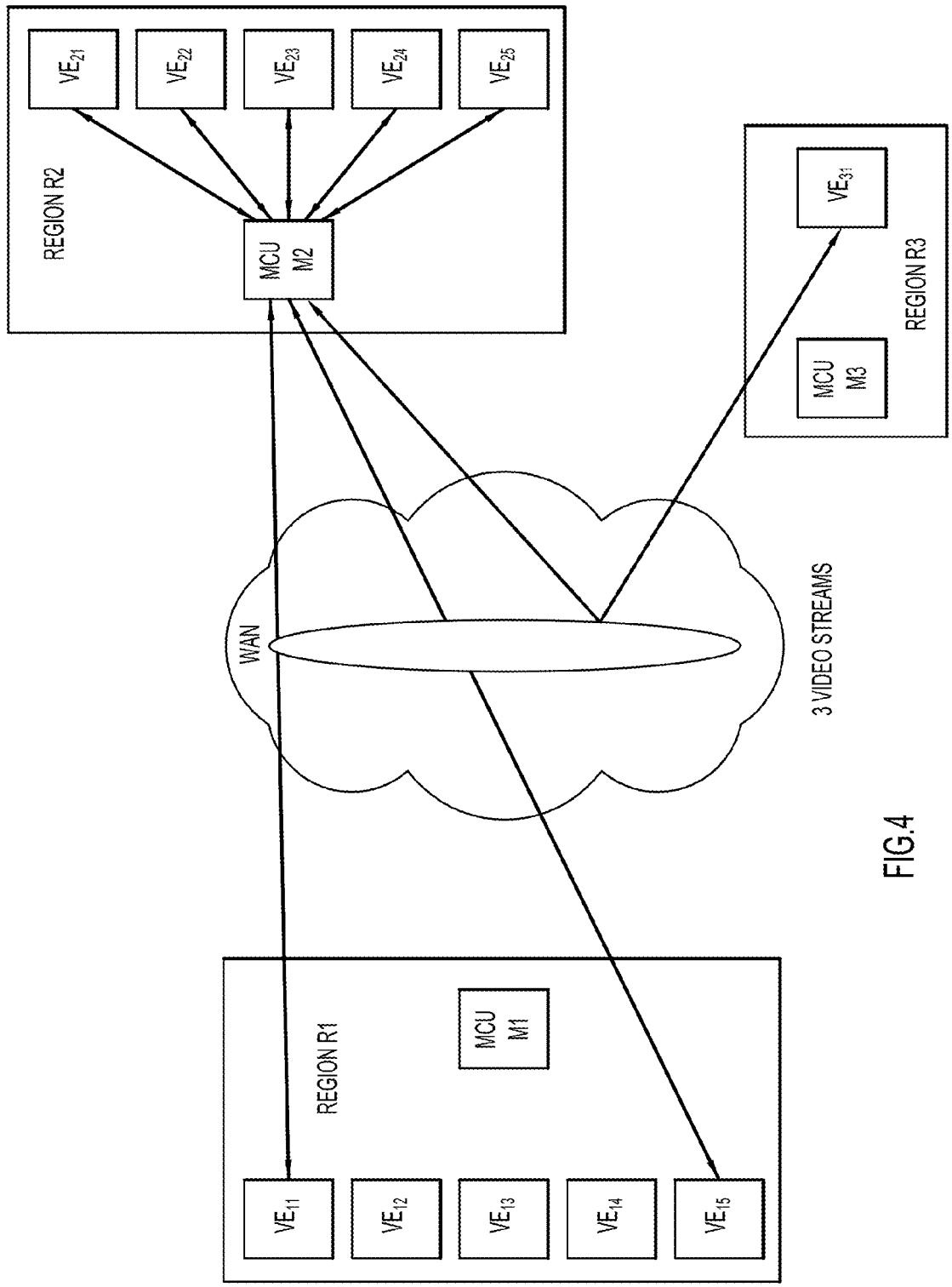
FIG. 4 is a diagram of the multi-region network showing the video stream WAN traffic resulting from hosting a video teleconference meeting among the second set of participants with a different MCU.

As shown in FIG. 4, Meeting No. 2 at 3:00 p.m. PST is now hosted at MCU M2 in region R2 where the majority of the source video streams are also located (five in this example). Only three source video streams traverse the WAN (two between regions R1 and R2 and one between regions R2 and R3) as compared to the six source video streams that traverse the network with the static assignment of static bridge ID to MCU M1 in region R1, as shown in FIG. 3.

WAN bandwidth savings using the techniques described herein can be significant. For example, consider a case in which all video streams use 2.0 Mbps average in steady state. If MCU M1 is used to host Meeting No. 2, then the WAN would be required to pass 12 Mbps (6 video streams×2 Mbps/stream). If, instead, MCU M2 is selected to host Meeting No. 2, only 6 Mbps (3 video streams×2 Mbps/stream) of WAN bandwidth are required, thereby reducing the WAN bandwidth utilization by half (12 Mbps to 6 Mbps). This result is summarized in Table 3 below.

TABLE 3

WAN Bandwidth Usage for Meeting 2 for MCU M1 and MCU M2 being Selected for Conducting Meeting No. 2

| Meeting Number | Time (PST) | MCU Selected | Number of Video Streams crossing WAN | Avg Bandwidth per video stream | WAN Bandwidth usage |
|---|---|---|---|---|---|
| 2 | 3:00 to 4:00 p.m. | M1 | 6 | 2 Mbps | 12 Mbps |
| 2 | 3:00 to 4:00 p.m. | M2 | 3 | 2 Mbps | 6 Mbps |

The use of stored historical call-in data provides some predictability of video conference (or "source") endpoints that will be used by video meeting participants to join a meeting to be conducted in the future. That is, the historical call-in data may provide a better indication as to which video conference endpoints will be used for a meeting at a particular day and time of day, compared to simply using the list of invitees to that future meeting. For example, some individuals may be regularly invited to a recurring (e.g., daily) meeting but rarely attend the meeting. Since the described technique evaluates location data for actual participants of past meetings rather than invitees for an upcoming meeting, such non-attending invitees do not bias the MCU selection process.

While the foregoing example relates to daily video meetings occurring at the same time each day, it will be appreciated that the concept is applicable to video meetings that occur regularly at other time intervals (e.g., twice a week, weekly, bi-weekly, monthly, quarterly, annually). In the case of regularly scheduled video meetings that occur at less frequent intervals that once per day, additional time criteria beyond time of day may be relevant to the analysis of which past video meetings should be correlated with an upcoming video meeting for purposes of selecting the best MCU. For example, suppose an individual regularly schedules video meetings at 8:00 a.m. on Mondays and Wednesdays each week. If the historical meeting data of past Monday 8:00 a.m. meetings indicates a location pattern of participants that is similar to that of the historical meeting data of past Wednesday 8:00 a.m. meetings, then the MCU selection logic should use the historical meeting data from both Monday and Wednesday 8:00 a.m. meetings to select the MCU for all 8:00 a.m. meetings held on Monday and Wednesdays. On the other hand, if the historical meeting data indicates significantly different location patterns of participants between the Monday and Wednesday meetings, then the MCU selection logic should use only historical meeting data of past Monday 8:00 a.m. meetings to select the MCU for upcoming Monday 8:00 a.m. meetings and use only the historical meeting data of past Wednesday 8:00 a.m. meetings to select the MCU for upcoming Wednesday 8:00 a.m. meetings. In this latter case, both the time of day (8:00 a.m.) and the day of the week (Monday or Wednesday) constitute historical time data that is used to correlate past video meetings with an upcoming video meeting. Similarly, the date of the month (e.g., the $7^{th}$) can be used as time data for correlation between past and future video meetings.

The description above with respect to a video bridge ID is as a particular network address, such as an address specified by a Uniform Resource Locator (URL). However, the video bridge ID may alternatively be a physical entity, e.g., a communications box, a piece of hardware, software, or both hardware and software, for handling the video and audio required for enabling a video meeting (e.g., it may correspond to a specific server or data center in a network).

FIG. 5 shows an exemplary table 500 that stores call detail records (CDRs) that can be used to select an appropriate MCU for a static ad hoc or rendezvous meeting according to techniques described herein. Table 500 may be provided within a call control device of a network, or may be located on a server or other type of network device. Each of the CDRs includes a user ID field 510, a user phone number field 520 of a phone number used to call into a video meeting, a bridge ID field 530 that is associated with the video meeting, and a call time field 540 that provides the time (e.g., specific date and time of day) during which the video meeting occurred. Based on this information, as well as information in other call control devices within the network, when an ad hoc meeting using a particular video bridge ID is scheduled for a future time, the CDRs stored in the call control devices within the network are accessed to find those CDRs that match with the particular video bridge ID of the future meeting, and that match or otherwise correlate with the date and/or time of day when the future meeting is to be conducted. Based on this subset of CDRs, each one having a particular video endpoint location associated therewith, an appropriate MCU from a list of candidate MCUs that is in a region having the maximum number of correlated video endpoint locations is selected for conducting this upcoming ad hoc meeting.

For example, if there are 55 CDRs that match with the same video bridge ID as is being used for the upcoming meeting, and if 15 of those 55 CDRs match in date and/or time of day for the upcoming meeting, the locations of persons who were the sources of those 15 CDRs (e.g., the callers who called into a meeting) are obtained to determine the video endpoints associated with those 15 CDRs, and the region with the greatest number of those video endpoints having matching data with the future meeting is determined.

Once the region with the greatest number of video conference endpoints occurring in previous time-correlated video meetings on a certain static bridge ID is determined, an MCU within that region is selected for conducting the upcoming video meeting on that static bridge ID. If there is more than one MCU in that region, then other characteristics can be utilized, such as the precise location of an MCU in that region that is closest to the "collective center of gravity" location based on the different locations of the video conference endpoints within that region.

The process of correlating the CDRs to date/time information of an upcoming rendezvous or ad hoc meeting scheduled to occur on a particular static bridge ID can be done in a variety of ways, while remaining within the spirit and scope of the techniques described herein. To provide some additional examples to further illustrate the concept, if an upcoming meeting is to be held at 9:00 a.m. on Tuesday, Jan. 15, 2013, then CDRs that match the 9:00 a.m. time, no matter what day of the month they occurred, can be retrieved as the correlated data. Alternatively, CDRs that match only with the $15^{th}$ of the month at 9:00 a.m. can be retrieved as the correlated data, or CDRs that match with the $15^{th}$ of the month no matter the time of day associated with those CDRs can be retrieved as the correlated data. The selection of the correlation criteria can be based on user input, such as only selecting relevant CDRs of past meetings with the same static bridge ID having a particular date and/or time of day criteria, and in which weightings can be applied to the correlated CDRs based on how closely those CDRs match to the date/time of day of the upcoming static rendezvous or ad hoc meeting.

In another technique for allocating an appropriate MCU for a static ad hoc or rendezvous video meeting that is to take place in the future, the stored CDR data is weighted based on the length in time from when that CDR was created. That is, CDRs that are based on video meetings in the recent past are weighted more heavily that CDRs that are based on video meetings that occurred in the more distant past. For example, a linear weighting factor may be applied to the stored CDRs, such that CDRs that are based on video meetings occurred within the last seven days are provided with a weighting factor of "1," CDRs that are based on video meetings that occurred within a time period between 14 days to 7 days from the present day are provided with a weighting factor of "0.95", CDRs that are based on video meetings that occurred within a time period between 21 days to 14 days from the present day are provided with a weighting factor of "0.90", etc. Alternatively, a different kind of weighting factor may be applied to the stored CDRs, such as an exponential weighting factor (i.e., $1/e^x$, where x is a number indicative of the time in days from when the CDR was created to the present time).

Accordingly, an MCU is preselected for a future static ad hoc or rendezvous meeting based on historical data that matches information of the future static ad hoc or rendezvous meeting, with that data being the static video bridge ID associated with the future meeting, and the day and/or time of day of the meeting. The region with the greatest number of video conference endpoints having CDRs that match the data associated with the future meeting is selected as a region in which an MCU is to be selected to host or otherwise conduct that future meeting.

Figure 6:
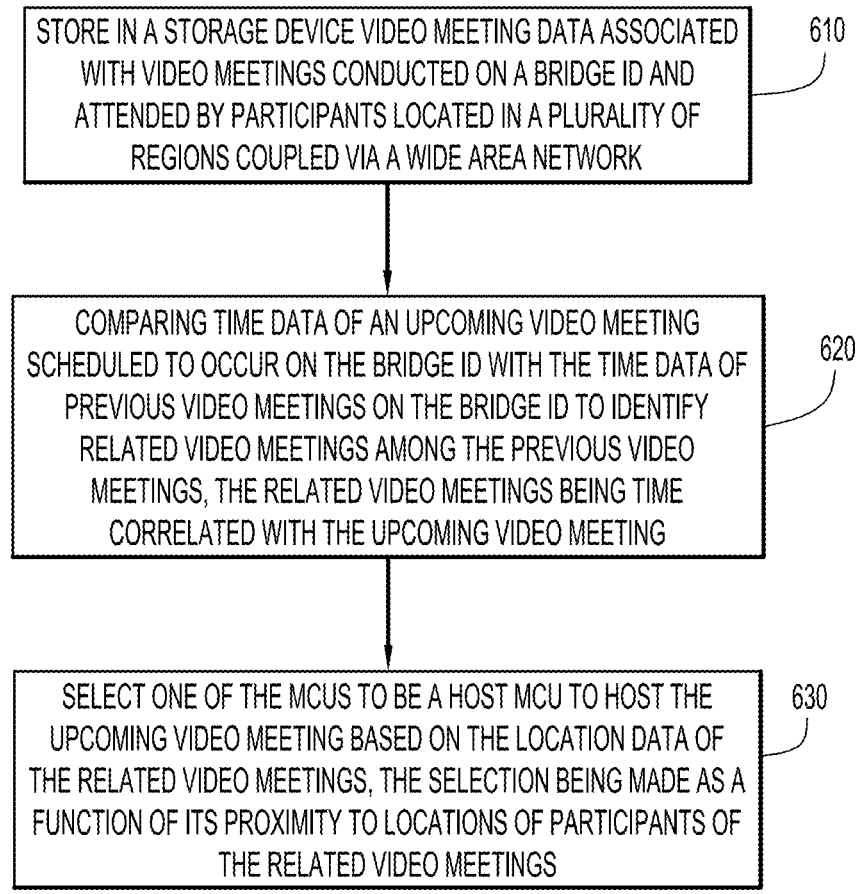
FIG. 6 is a flow diagram of a process for selecting an appropriate MCU for conducting a static video conference according to the techniques presented herein.

FIG. 6 is a flow diagram of an MCU selection process for a static video conference according to the techniques described above. In operation 610, video meeting data associated with video meetings conducted on a bridge ID and attended by participants located in a plurality of regions coupled via a wide area network are stored in a storage device. MCUs capable of hosting video meetings are located in at least some of the regions, and the video meeting data stored for each video meeting includes time data indicating a scheduled meeting time of the video meeting and location data indicating locations of participants of the video meeting.

In operation 620, time data of an upcoming video meeting scheduled to occur on the static bridge ID is compared with the time data of previous video meetings on the bridge ID to identify related video meetings among the previous video meetings, the related video meetings being time correlated with the upcoming video meeting. In operation 630, one of the MCUs is selected to be a host MCU to host the upcoming video meeting based on the location data of the related video meetings, in which the host MCU is selected as a function of its proximity to locations of participants of the related video meetings.

The selection of the host MCU for the upcoming video meeting may be made to correspond to the MCU located in a same region as a highest number of participants in the related video meetings that occurred in the past. As such, the host MCU may be selected without consideration (irrespective of) locations of the invitees or participants in the upcoming video meeting.

The selection of the host MCU for the upcoming video meeting can be made based on a determination that the host MCU would have minimized WAN bandwidth usage relative to other MCUs had the host MCU hosted the related video meetings that occurred in the past (e.g., the ones having the same static bridge ID as the upcoming meeting and having time correlation to the date/time of the upcoming meeting). The time correlation may be based on at least one of date of month, day of week, and time of day.

In the foregoing examples, MCUs M1, M2, M3 were assumed for simplicity to be of equal scale and capacity. In an actual implementation, the MCUs deployed across a network may differ in this regard. Thus, selection of an appropriate MCU may be based not only on the best MCU from a location perspective using the historical call detail records as described above, but the selection may also based on an MCU that is best suited to handle an upcoming static video conference. Thus, if the upcoming static video conference is to be attended by many attendees, such as several hundred, then a separate "MCU processing capability" factor may be considered as well, in determining the appropriate MCU to conduct the meeting (i.e., WAN bandwidth utilization may be only one factor considered in selection of the best MCU to host an upcoming video meeting).

In one example, an equation $\{(A+B)*X_n\}$ may be used to select the appropriate MCU when the number of invitees exceeds a predetermined number (e.g., over 15 invitees), where A is a weighting factor (e.g., a real number between 0 and 1) associated with the processing capability of an MCU (the greater the processing capability the greater the weighting factor A), where B is a weighting factor (e.g., a real number between 0 and 1) associated with the "age" of the CDRs that match the criteria associated with the upcoming meeting (the more recent the CDR, the greater the weighting factor applied to the "location" of that CDR as compared to the "location" of older CDRs that also match the upcoming meeting criteria), and where $X_n$ is a variable associated with the respective candidate MCUs (MCU1, MCU2, ..., MCUn) to be considered for conducting the upcoming meeting.

Figure 7:
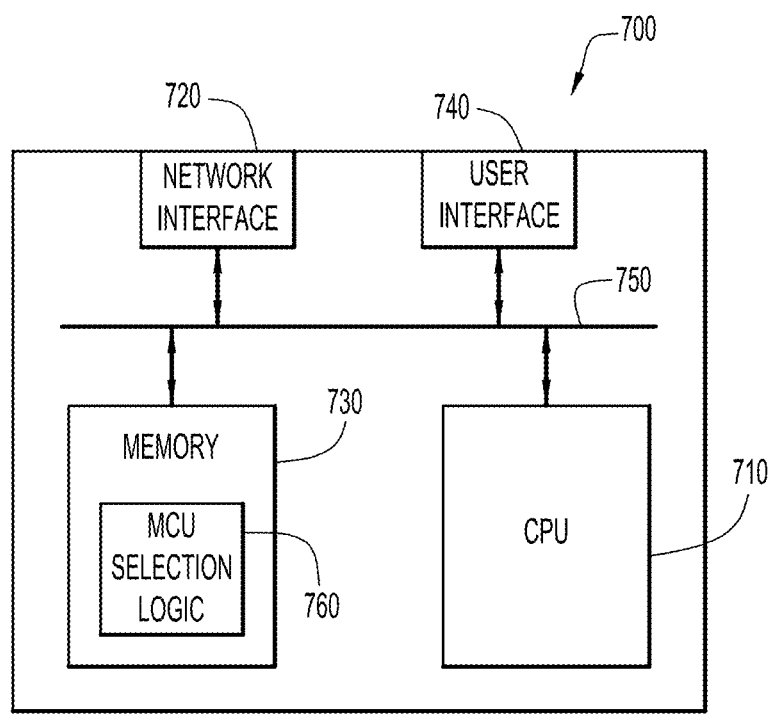
FIG. 7 is a block diagram of a network device that may be used to implement the MCU selection techniques presented herein.

Turning now to FIG. 7, an example block diagram is shown of a network device 700 that is configured to select an appropriate MCU for use in a future static meeting according to the techniques described above. Network device 700 can be, for example, an endpoint device also used for transmitting and receiving video, or network device 700 can be some other processing or computing resource in the network such as a server device (e.g., Cisco Unified Communication Manager (CUCM) or Video Communication Server (VCS)). Network device 700 includes a central processing unit (CPU) 710, a network interface unit 720, a memory 730, and optionally a user interface 740 (e.g., keyboard/mouse, display, microphone, speakers, etc.), each of which is interconnected via a bus 750. Network interface unit 720 is a network interface card (NIC), for example, that enables network communications on behalf of network device 700.

Memory 730 stores data received and generated in the course of operation of network device 700. For example, memory 730 stores video meeting data (e.g., time data and location data) associated with video meetings for correlation with the timing of upcoming video meetings and MCU selection. Memory unit 730 also stores or is encoded with software, for execution by CPU 710, for performing the operations of network device 700. To this end, memory unit 730 stores MCU selection software or logic 760. MCU selection software 760 enables network device 700 to choose an MCU that is likely to minimize transmissions of video streams over the network during a future video meeting based on patterns of video endpoint locations experienced in past video meetings that are temporally related (e.g., same date, day of week, time of day) to the future meeting, as previously described.

Memory 730 may comprise read only memory (ROM), random access memory (RAM), magnetic disk storage media devices, optical storage media devices, flash memory devices, electrical, optical, or other physical/tangible memory storage devices. CPU 710 is, for example, a microprocessor or microcontroller that executes instructions for the MCU selection software 760. Thus, in general, memory 730 may comprise one or more tangible (non-transitory) computer readable storage media (e.g., a memory device) encoded with software comprising computer executable instructions and when the software is executed (by the processor CPU 710) it is operable to perform the operations described herein for MCU selection software 760.

In general, network device 700 can be implemented in any kind of apparatus, device, or machine for processing data, including by way of example a programmable processor, a computer, a system on a chip, or multiple ones, or combinations thereof. Network device 700 can include special purpose logic circuitry, e.g., an FPGA (field programmable gate array) or an ASIC (application specific integrated circuit). Network device 700 can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The network device and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. In some implementations, fuzzy logic or neural networks may be utilized to determine the appropriate MCU to conduct an upcoming static ad hoc or rendezvous video meeting based on past video meeting historical data that includes static bridge ID information, participant location information, and the times (e.g., specific date and/or time of day) when those past video meetings took place. The method of performing past video conference data correlation with respect to information of an upcoming video conference can be done in any of a variety of known ways, while remaining within the spirit and scope of the techniques described herein, and the above description is intended by way of example only.

What is claimed is:

1. A method comprising:
    storing in a storage device video meeting data associated with video meetings conducted on a bridge ID and attended by participants located in a plurality of regions coupled via a wide area network, wherein multipoint control units (MCUs) capable of hosting video meetings are located in at least some of the regions, the video meeting data stored for each video meeting including time data indicating a scheduled meeting time of the video meeting and location data indicating locations of participants of the video meeting;
    comparing time data of an upcoming video meeting scheduled to occur on the bridge ID with the time data of previous video meetings on the bridge ID to identify related video meetings among the previous video meetings, the related video meetings being time correlated with the upcoming video meeting; and
    selecting one of the multipoint control units (MCUs) to be a host MCU to host the upcoming video meeting based on the location data of the related video meetings, wherein the host MCU is selected as a function of its proximity to locations of participants of the related video meetings.

2. The method of claim 1, wherein the host MCU for the upcoming video meeting is selected to be located in a same region as a highest number of participants in the related video meetings.

3. The method of claim 1, wherein the host MCU is selected without consideration of identities or locations of invitees or participants in the upcoming video meeting.

4. The method of claim 1, wherein the host MCU for the upcoming video meeting is selected based on a determination that the host MCU would have minimized WAN bandwidth usage relative to other MCUs had the host MCU hosted the related video meetings.

5. The method of claim 1, wherein the time data comprises at least one of date of month, day of week, and time of day of the related video meetings, and the related video meetings are time correlated with the upcoming video meeting in at least one of: date of month, day of week, and time of day.

6. The method of claim 1, wherein the location data comprises a telephone number area code.

7. The method of claim 6, wherein the bridge ID corresponds to a Universal Resource Locator (URL) network address.

8. An apparatus comprising:
a storage unit configured to store video meeting data associated with video meetings conducted on a bridge ID and attended by participants located in a plurality of regions coupled via a wide area network, wherein multipoint control units (MCUs) capable of hosting video meetings are located in at least some of the regions, the video meeting data stored for each video meeting including time data indicating a scheduled meeting time of the video meeting and location data indicating locations of participants of the video meeting; and
a processor unit coupled to the storage unit and configured to:
compare time data of an upcoming video meeting scheduled to occur on the bridge ID with the time data of previous video meetings on the bridge ID to identify related video meetings among the previous video meetings, the related video meetings being time correlated with the upcoming video meeting; and
select one of the MCUs to be a host MCU to host the upcoming video meeting based on the location data of the related video meetings, wherein the host MCU is selected as a function of its proximity to locations of participants of the related video meetings.

9. The apparatus of claim 8, wherein the processor unit is configured to select an MCU located in a same region as a highest number of participants in the related video meetings to be the host MCU for the upcoming video meeting.

10. The apparatus of claim 8, wherein the processor unit is configured to select the host MCU without consideration of identities or locations of invitees or participants in the upcoming video meeting.

11. The apparatus of claim 8, wherein the processor unit is configured to select the host MCU for the upcoming video meeting based on a determination that the host MCU would have minimized WAN bandwidth usage relative to other MCUs had the host MCU hosted the related video meetings.

12. The apparatus of claim 8, wherein the related video meetings are time correlated with the upcoming vide meeting in at least one of: date of month, day of week, and time of day.

13. The apparatus of claim 8, wherein the location data comprises a telephone number area code.

14. The apparatus of claim 8, wherein the bridge ID corresponds to a Universal Resource Locator (URL) network address.

15. A computer readable non-transitory tangible storage media encoded with instructions that, when executed by a processor, cause the processor to:
store video meeting data associated with video meetings conducted on a bridge ID and attended by participants located in a plurality of regions coupled via a wide area network, wherein multipoint control units (MCUs) capable of hosting video meetings are located in at least some of the regions, the video meeting data stored for each video meeting including time data indicating a scheduled meeting time of the video meeting and location data indicating locations of participants of the video meeting;
compare time data of an upcoming video meeting scheduled to occur on the bridge ID with the time data of previous video meetings on the bridge ID to identify related video meetings among the previous video meetings, the related video meetings being time correlated with the upcoming video meeting; and
select one of the multipoint control units (MCUs) to be a host MCU to host the upcoming video meeting based on the location data of the related video meetings, wherein the host MCU is selected as a function of its proximity to locations of participants of the related video meetings.

16. The computer readable non-transitory tangible storage media of claim 15, wherein the instructions for selecting comprise instructions for selecting an MCU located in a same region as a highest number of participants in the related video meetings to be the host MCU for the upcoming video meeting.

17. The computer readable non-transitory tangible storage media of claim 15, wherein the instructions for selecting include instructions for selecting the host MCU without consideration of identities or locations of invitees or participants in the upcoming video meeting.

18. The computer readable non-transitory tangible storage media of claim 15, wherein the instructions for selecting include instructions for selecting the host MCU for the upcoming video meeting based on a determination that the host MCU would have minimized WAN bandwidth usage relative to other MCUs had the host MCU hosted the related video meetings.

19. The computer readable non-transitory tangible storage media of claim 15, wherein the time data comprises at least one of date of month, day of week, and time of day of the related video meetings, and the related video meetings are time correlated with the upcoming video meeting in at least one of: date of month, day of week, and time of day.

20. The computer readable non-transitory tangible storage media of claim 15, wherein the location data comprises a telephone number area code.

21. The computer readable non-transitory tangible storage media of claim 15, wherein the bridge ID corresponds to a Universal Resource Locator (URL) network address.

22. The method of claim 1, wherein the upcoming video meeting is a non-reserved meeting in which locations of invitees are not reserved in advance.

23. The apparatus of claim 8, wherein the upcoming video meeting is a non-reserved meeting in which locations of invitees are not reserved in advance.

24. The computer readable non-transitory tangible storage media of claim 15, wherein the upcoming video meeting is a non-reserved meeting in which locations of invitees are not reserved in advance.

* * * * *